United States Patent Office 3,555,162
Patented Jan. 12, 1971

3,555,162
METHOD OF CONTROLLING NEMATODES
Barbara Stearns, Highland Park, N.J., assignor to E. R. Squibb & Sons, Inc., New York, N.Y., a corporation of Delaware
No Drawing. Filed June 3, 1968, Ser. No. 733,821
Int. Cl. A01n 9/00, 9/24
U.S. Cl. 424—331                    3 Claims

ABSTRACT OF THE DISCLOSURE

Soil nematodes are controlled by applying to the infected soil effective amounts of 2-methyl-1,3-diphenyl-1,3-propanedione.

---

This invention relates to compositions and methods for the control of plant pathogenic nematodes, employing as the essential active ingredient, 2-methyl-1,3-diphenyl-1,3-propanedione.

Nematodes are round worms which infest soil and attack plants throughout the world. Plants infected by pathogenic nematodes have a weak, sickly appearance. The roots of affected plants are stunted. Numerous galls, knots or lesions form on the roots. The plant may appear nutritionally deficient.

Methods and compositions heretofore known for the control of nematodes have usually been either inconvenient to use or too expensive for widespread application. Many nematocides are highly injurious not only to man and animals but are phytotoxic to plants and seeds. It is especially unexpected to discover an effective nematocide which is substantially non-toxic to plants. The disadvantages of the prior art compositions and methods are avoided according to this invention by treating soil infested with nematodes with 2-methyl-1,3-diphenyl-1,3-propanedione.

In use, this compound is applied to areas to be protected from nematodes in any of a variety of formulations. Preferably, the compound is extended with carriers or conditioning agents of the kind used and commonly referred to in the art as adjuvants or modifiers. Such adjuvants are inert solids, surface-active agents and organic liquids.

The 2 - methyl - 1,3 - diphenyl - 1,3 - propanedione of this invention is incorporated in such compositions in sufficient amount to exert a nematocidal effect. Usually from about 1 to 95 percent by weight of the compounds are included in such formulations.

Solid formulations are prepared with inert powders. The formulations thus prepared are used as such, diluted further with inert solids to form dusts, or suspended in a suitable liquid medium for spray application.

The powders usually comprise the active ingredient admixed with minor amounts of conditioning agents. Neutral clays, for example, the absorptive attapulgite or the relatively non-absorptive china clays, diatomaceous earth, walnut shell flour, redwood flour, synthetic fine silica, calcium silicate and other inert solid carriers of the kind conventionally employed in powder formulations are used. Industrial fertilizers and dry soil are useful as conditioning agents.

The active ingredient is suitably about 1 to 95 percent by weight of the compositions. The solids preferably are finely divided and have a particle size below about 50 microns or, better, below about 20 microns. Dust formulations are prepared using talc, pyrophyllite, tobacco dust, volcanic ash or other dense, inert solids as diluents.

Liquid compositions are prepared by mixing the active compound with suitable liquid diluent media. The active compound is either in solution or in suspension in the liquid medium. Suitable liquid media include kerosene, Stoddard solvent, xylene, alcohols, alkylated naphthalenes, diesel oil, glycols and ketones, for example, diisobutyl ketone and cyclohexanone. The active ingredient is preferably incorporated at a concentration of from about 0.5 to 50 percent by weight of these liquid compositions. These compositions are used as such or extended by emulsification with water.

Nematocidal wettable powders or liquids suitably include one or more surface-active agents, for example, wetting, dispersing, or emulsifying agents. Compositions containing these surface-active agents disperse or emulsify easily in water to form aqueous sprays. The compositions suitably contain up to 10 percent by weight of the surface-active agents, but some surface-active agents are effective at less than 1 percent.

Surface-active agents are suitably of the anionic, cationic, or nonionic type. Exemplary of such agents are sodium oleate, sulfonated petroleum oils, alkyl aryl sulfonates, sodium lauryl sulfate, polyethylene oxides, lignin sulfonates, and the like. Additional suitable agents are described by McCutcheon in "Soap and Chemical Specialties," volume 31, Nos. 7–10 (1955).

Nematocidal compositions are applied to cultivated land and mixed with top soil. The rate of application is sufficient to exert the desired nematocidal action. Dosage depends on the components of the formulation, method of application, type and quantity of nematodes, duration of treatment, climatic conditions and lesser factors. Application rates of from 1 to 50 pounds of the active ingredient per acre are usually satisfactory for nematode control, but higher rates may also be used. After application, the compositions are preferably worked into the ground to a depth of 4 to 6 inches.

EXAMPLE I

2 - methyl - 1,3 - diphenyl - 1,3 - propanedione was tested against a species of Meloidogyne which produces galls or root knots on the roots of tomato, cucumber, squash, etc. In this test, steam-sterilized soil is infested with 6 grams of finely chopped galled tomato roots per gallon of soil. The 2-methyl-1,3-diphenyl-1,3-propanedione is then mixed with the soil at rates of 0.1 to 0.5 gram per gallon, which are the equivalent to field rates of nematocides now in use. The treated infested soil is covered and held for one week, after which tomato plants, cucumber seeds, and squash seeds are transplanted into four replicate subsamples. About four weeks later, the roots are washed free of soil and the effectiveness of the chemical is determined by counting the number of galls from treated versus untreated soil. In this test the 2-methyl - 1,3 - diphenyl - 1,3 - propanedione produced 100 percent root knot control at 0.5 gram per gallon without causing injury to the tomato or cucumber plants. The condition of roots, tops and the height of the plants grown in the treated soil were normal. No phytotoxicity was observed.

EXAMPLE II

A nematocidal powder is prepared by blending 75 parts of 2-methyl-1,3-diphenyl-1,3-propanedione with 20 parts of fine attapulgite clay, 2 parts of alkylated naphthalene sulfonic sodium salt wetting agent, 0.2 part of low viscosity methyl cellulose dispersant and 2.8 parts of disodium phosphate (all parts by weight). The mixture is ground to an average particle size of about 50 microns and blended until homogeneous.

About 5 pounds of this formulation is dispersed in 100 gallons of water and applied at a rate of 50 pounds of active ingredient per acre to land infested with pathogenic nematodes. The soil is then disced. Cucumbers grown in the treated soil are normal and free from nematode infection.

EXAMPLE III

An aqueous suspension is prepared by mixing 2-methyl-1,3-diphenyl-1,3-propanedione with the other ingredients listed below and then wet milling the mixture.

| | Parts by wt. |
|---|---|
| 2-methyl-1,3-diphenyl-1,3 - propanedione | 30 |
| Sodium lignosulfonate | 15 |
| Fuller's earth | 3.3 |
| Low viscosity methyl cellulose | 0.5 |
| Disodium phosphate | 1.0 |
| n-Octyl alcohol | 0.2 |
| Water | 50.0 |

This suspension mixes readily with water to form substantially non-flocculating aqueous dispersions, and is applied using conventional spray equipment at a rate of 40 pounds of active agent per acre. Tomatoes grown in the treated soil are normal and free from nematode infection.

EXAMPLE IV

An emulsifiable oil composition is prepared by blending 2-methyl-1,3-diphenyl-1,3-propanedione, wetting agent and oil together until a completely homogeneous mixture is obtained.

| | Parts by wt. |
|---|---|
| 2-methyl-1,3-diphenyl-1,3-propanedione | 33 |
| Polyoxyethylene sorbitan trioleate | 11 |
| Stoddard solvent | 56 |

This composition disperses in water to form an emulsion suitable for application as a spray. One part of this formulation is diluted with 5 parts water (parts by volume) and the resulting emulsion applied at the rate of 40 gallons per acre. Squash grown in the treated soil are normal and free from nematode infection.

EXAMPLE V

A nematocidal dust is prepared by blending 2-methyl-1,3-diphenyl-1,3-propanedione with the diluents listed below and micro-pulverizing the mix to an average particle size of about 30 microns. The resulting mixture is suitably applied with ordinary dusting equipment at a rate of 30 pounds of active ingredient per acre.

| | Parts by wt. |
|---|---|
| 2-methyl-1,3-diphenyl-1,3 - propanedione | 15 |
| Diatomaceous silica | 20 |
| Pyrophyllite | 60 |
| Lauryl alcohol | 5 |

Cucumbers grown in the treated soil are normal and free from nematode infection.

This invention may be variously otherwise embodied within the scope of the appended claims.

What is claimed is:

1. A method for the control of nematodes comprising applying to nematodes a nematocidal amount of 2-methyl-1,3-diphenyl-1,3-propanedione.

2. The method of claim 1 in which said compound is employed in a composition containing 1 to 95 percent by weight of 2-methyl-1,3-diphenyl-1,3 - propanedione, the balance selected from the group consisting of inert solid carriers and inert liquid carriers.

3. The method of claim 2 in which a surface-active agent is also present in said composition.

References Cited

UNITED STATES PATENTS 2,107,298    2/1938    Kilgore _____ 167—22

OTHER REFERENCES

Metcalf, Organic Insecticides, Their Chemistry and Mode of Action, p. 233, 1956.

Lutz et al., Chem. Abs., vol. 51, pp. 2718–2719, 1957.

Dreiding et al., Chem. Abs., vol. 48, pp. 10616–10617, 1954.

Scala et al., Chem. Abs., vol. 62, 1965, p. 9054.

ALBERT T. MEYERS, Primary Examiner

A. J. ROBINSON, Assistant Examiner